Feb. 1, 1966 P. H. SHERRON 3,231,943

TELEPHONE BOOTH INSTALLATION

Filed July 1, 1963 4 Sheets-Sheet 1

INVENTOR.
PERCIVAL H. SHERRON
BY
Busser, Smith & Harding
ATTORNEYS

INVENTOR.
PERCIVAL H. SHERRON
BY
Busser, Smith & Harding
ATTORNEYS

Feb. 1, 1966 P. H. SHERRON 3,231,943

TELEPHONE BOOTH INSTALLATION

Filed July 1, 1963 4 Sheets-Sheet 3

INVENTOR.
PERCIVAL H. SHERRON
BY
Busser, Smith & Harding
ATTORNEYS

Feb. 1, 1966 P. H. SHERRON 3,231,943

TELEPHONE BOOTH INSTALLATION

Filed July 1, 1963 4 Sheets-Sheet 4

INVENTOR.
PERCIVAL H. SHERRON
BY
Busser, Smith & Harding
ATTORNEYS

United States Patent Office 3,231,943

Patented Feb. 1, 1966

3,231,943

TELEPHONE BOOTH INSTALLATION

Percival H. Sherron, Jamaica, Long Island, N.Y. (% Sherron Metallic Corp., 1201 Flushing Ave., Brooklyn 37, N.Y.)

Filed July 1, 1963, Ser. No. 291,913

5 Claims. (Cl. 52—234)

This invention relates to a telephone booth installation comprising a pair of telephone booths.

The invention involves the provision of a group telephone booth installation comprising a pair of individual booths requiring a minimum amount of material and a minimum number of parts. Briefly, the construction comprises an S-shaped wall which defines a pair of adjacent, substantially cylindrical individual booths. By this construction, telephones may be positioned in adjacent booths with substantial spacing therebetween and facing in opposite directions so that a good acoustic or transmission efficiency may be obtained. Also, the booths may be constructed without a door if desired and will still provide satisfactory acoustic efficiency whereby less space is required.

A general object of this invention is to provide a telephone booth installation of the indicated type having walls which can be fabricated easily and rapidly and which can be readily assembled to form a telephone booth. In accordance with this invention, various parts of the wall structure are made of identical sections which reduces the number of different parts involved and accordingly reduces the cost of the telephone booth construction.

Another object is to provide a ceiling panel construction in accordance with which the ceiling panel may be installed and removed rapidly and easily for access to the ceiling of the booth.

The above and other objects and features of the invention will become apparent from the following description when read in conjunction with the accompanying drawings, in which.

The telephone booth installation in accordance with this invention has an S-shaped upright wall, indicated generally at 10, which defines a pair of substantially cylindrical telephone booths 12 and 14. The upright wall comprises six sections 16, 18, 20, 22, 24 and 26. Each of the sections is identical and has a shape approximating a quarter of a circle. The sections are preferably made of a clear plastic such as Plexiglas, although any suitable material may be used. The sections are supported to define cylindrical booths 12 and 14 in the manner best shown in FIGURE 11, the details of the mounting structure being more fully described hereafter.

Figure 11:
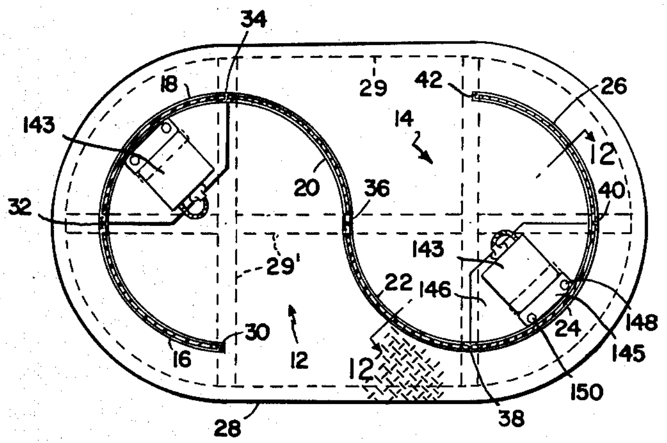
FIGURE 11 is a section taken on the line 11—11 of FIGURE 1.

The telephone booth installation comprises a substantially oval-shaped base plate 28 which serves as the floor of the booths 12 and 14. Welded to the underside of plate 28 are an oval-shaped strip 29 extending around the periphery and a plurality of cross strips 29' as shown in FIGURE 11. These reinforcing strips rest on the supporting surface for the telephone booth installation. The top surface of the plate 28 is roughened as shown in FIGURE 11 to prevent slipping by booth users. Suitable means are provided for mounting the upright wall 10 in an upright position on the plate 28. Such means comprises a plurality of upright posts 30, 32, 34, 36, 38, 40 and 42.

Figure 9:
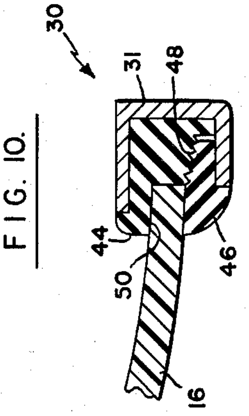
FIGURE 9 is a section taken on the line 9—9 of FIGURE 1.

The end post 30 is illustrated in FIGURE 9 and comprises a U-shaped channel member 31. One of the side legs of the channel member 31 is slightly longer than the other. A molding comprising two strips 44 and 46 is contained within the channel member 30, the strips being engaged at a serrated wall 48. The strips 44 and 46 define a vertically extending channel 50 adapted to receive the vertical edge of the section 16. In order to install the wall sections into the channels, the molding strip 44 is fitted into the channel first. Then the curved wall section is positioned into the portion of groove 50 defined by the molding section 44. Finally, the other section 46 of the molding is wedged into place with the serrated edges between the sections being interlocked so that the wall section is held in place. The end post 42 has a construction identical with the post 30 and supports the outer edge of the section 26.

Figure 10:
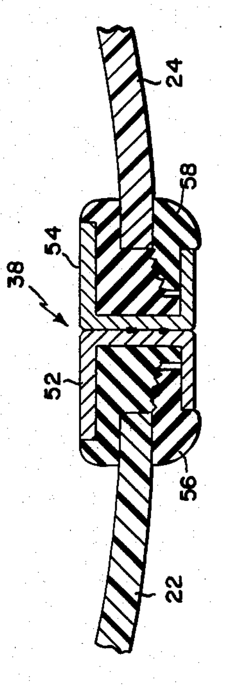
FIGURE 10 is a section taken on the line 10—10 of FIGURE 1.

The post 38 is illustrated in FIGURE 10 and comprises a pair of U-shaped channel members 52 and 54 identical with the channel member 31 of the end post 30. The channel members 52 and 54 are welded together at their bases which are placed side by side and contain moldings 56 and 58, respectively. The moldings 56 and 58 are the same as the molding in post 30 and receive the vertical edges of the sections 22 and 24. Posts 34, 38 and 40 are identical with the post 32. Post 34 supports the vertically extending ends of the sections 18 and 20, post 38 supports the vertically extending ends of sections 22 and 24, and post 40 supports the vertically extending ends of sections 24 and 26.

Post 36 is similar to post 38, the only difference being that the channels are positioned with the short leg adjacent the long leg, as is best shown in FIGURE 11. The reason for this difference is that at post 36 the direction of curvature changes.

Each of the wall sections is supported at its lower end wall by a bottom channel 60. All of the bottom channels are identical in construction, define a channel of the same width as the vertical channels and contain similar wall accommodating molding. Each bottom channel 60 is mounted at its ends between adjacent vertical channels.

Figure 4:
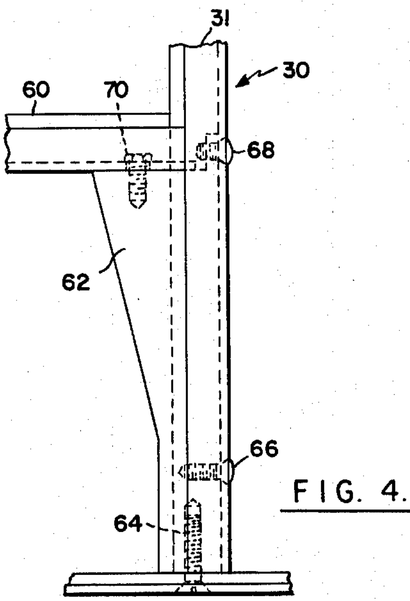
FIGURE 4 is an enlarged fragmentary view of a detail of the side wall supporting structure as indicated by the broken line circle A in FIGURE 1.

FIGURE 4 illustrates the manner in which the posts are mounted on the base plate and the manner in which the bottom channels are mounted to an end post. The channel member 31 of post 30 fits snugly over a solid base block 62. Base block 62 is mounted in an upright position on base plate 28 by a mounting screw 64 which projects through a countersunk hole in the floor plate and threadedly engages the base block 62. Base block 62 is secured with channel 30 by a pair of mounting screws 66 and 68 which project through countersunk holes in the base of the channel 31 for threaded engagement with the base block 62. In this manner, the post 30 is held in an upright position on the base plate 28.

The bottom channel 60 rests on the upper end of base block 62 which is enlarged in this region. Bottom channel 60 is fastened to base block 62 by a mounting screw 70 which projects through a slot in the base of channel 60 and threadedly engages the base block 62. The legs of the channel 60 are dimensioned with a length such that they terminate adjacent the ends of the legs of vertical channel 31.

Figure 5:
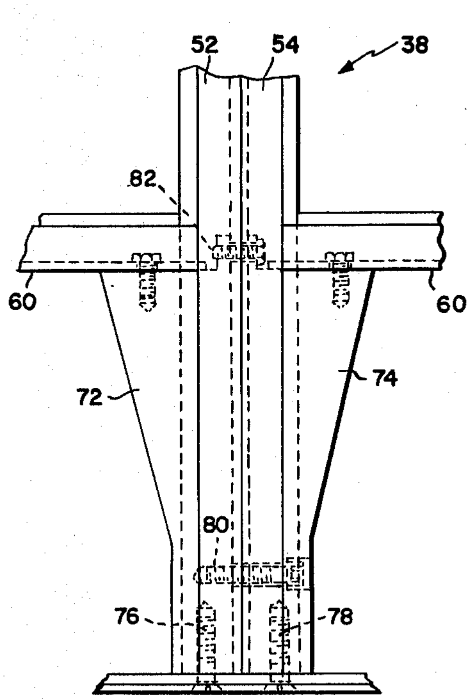
FIGURE 5 is an enlarged fragmentary view of another detail of the wall supporting structure as indicated by the broken line circle B in FIGURE 1.

The mounting arrangements for each of the intermediate posts 32, 34, 36, 38 and 40 are similar and this mounting is illustrated in FIGURE 5 wherein post 38 is shown. The channel members 52 and 54 of post 38 have solid base blocks 72 and 74 fitted snugly therein. Base blocks 72 and 74 are mounted in an upright position on the floor plate 28 by mounting screws 76 and 78, respectively, which project through countersunk holes in the plate and threadedly engage the base blocks 72 and 74, respectively. The base blocks 72 and 74 are secured to the channel members 52 and 54 at a lower position by a mounting screw 80 which projects through aligned openings in base block 74, the base of channel member 54 and the base of channel member 52 to threadedly engage base block 72. The head of screw 80 engages a recessed shoulder formed in base block 74. The base blocks 72 and 74 are connected to the channel members 52 and 54 at an upright position by a mounting screw 82 which projects through openings in a flange in base block 74, the base of channel member 54, and the base of channel member 52 to threadedly engage a flange on base block 72. In this manner, the post 38 is held securely in an upright position on the floor plate 28.

The bottom channels 60 for the wall sections 22 and 24 are mounted on the base blocks 72 and 74, respectively in the same manner as the bottom channel 60 for the wall section 16 as described above. Each of these bottom channels rests on the upright end of a base block and is fastened thereto by a mounting screw which projects through a slot in the base of the channel and which threadedly engages the base block. As in the case of the FIGURE 4 mounting, the legs of the channels 60 are dimensioned with a length such that they terminate adjacent the ends of the legs of their associated vertical channel.

Each of the wall sections is held at its upper end by a top channel 90. All of the top channels are identical in construction and define a channel of the same width as the vertical channels and, of course, contain similar molding for accommodating the wall sections. Each top channel 90 is mounted at its ends on adjacent vertical channels to extend therebetween.

Figure 6:
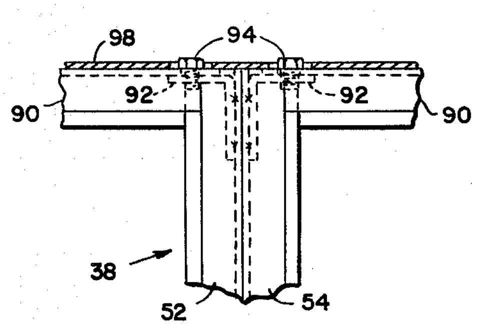
FIGURE 6 is an enlarged fragmentary view of a detail of the top portion of the wall supporting structure as indicated by the broken line circle C in FIGURE 1.

FIGURE 6 illustrates the manner in which the top channels are mounted on the vertical channels. As shown in this figure, each of the vertical channel members comprises an angular member 92 which is secured to the upper end thereof. The vertical leg of member 92 is secured to the base of its associated channel. Accordingly, angular member 92 provides a horizontally extending leg at the top of the post. The base of the bottom channel 90 is arranged to rest on the horizontal leg of the angular member 92. Top channel 90 is fastened to the horizontal leg of member 92 by a mounting screw 94 which projects through a slot in the base of top channel 92 to threadedly engage the member 92. The legs of the channel 90 are dimensioned with a length so that they terminate adjacent the ends of the legs of the vertical channel.

By reason of the above-described construction, each of the wall sections is mounted securely by means of the vertical channels in the upright posts, a top channel and a bottom channel. The mounting of the upright posts to the floor plate provides a sturdy booth construction defining the individual booths 12 and 14.

Figure 7:
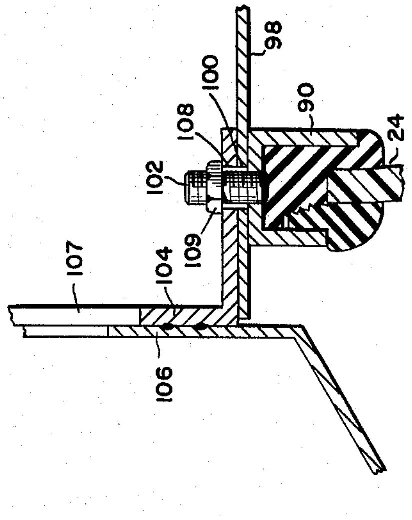
FIGURE 7 is an enlarged fragmentary view of a detail of the ceiling and roof structure as indicated by the broken line circle D in FIGURE 3.

An oval-shaped ceiling 98 for the installation rests on the top channels 90. Ceiling 98 has a plurality of openings 100 along the S-shaped track of the wall 10. There are three openings 100 for each of the top channels, which openings receive a threaded pin 102 which is secured to the top channel member to extend upwardly therefrom as is best shown in FIGURE 7. Resting on the ceiling 98 is an oval-shaped angle 104 which is secured to the vertical side wall of the oval-shaped roof 106. In the areas in which the angle 104 overlies the pins 102, the angle is provided with openings 108 adapted to receive the pins. The roof and ceiling are fixed in position by means of nuts 109 which are tightened onto the pins 102 to engage either the ceiling or the angle as the case may be. Accordingly, each of the top channels 90, as well as each of the vertical posts, are fastened to the ceiling 98, which construction adds to the rigidity of the installation. Moreover, the roof and the support channels are preferably made of a strong stainless steel.

The lighting means 110 for each of the telephone booths 12 and 14 preferably takes the form of one or more circular fluorescent tubes accompanied by the usual electrical devices for their operation, for example, ballast transformers and starters, which are conventionally encased by an enclosure 112. Enclosure 112 is mounted on a channel member 114 which extends longitudinally of the booth and is supported on legs 116 by the ceiling 98. The lighting means is mounted on this channel member 114 by suitable brackets in a well-known manner. The side wall of the roof 106 has the letters for the word "TELEPHONE" cut out therein. A strip of translucent Plexiglas 107 is mounted on the side wall of the roof 106 behind the letters. By reason of this construction, light will shine through the cut outs in the side wall of the roof.

A circular light panel 120 is provided beneath each of the lighting means 110. Panels 120 are preferably made of a white translucent Plexiglas for the transmission of light from the lighting means to the interior of the booth. Means are provided for mounting the panels 120 on the ceiling so that they are held securely in position and may be readily and easily moved to provide access to the compartment above the ceiling. In this regard, only the means for the booth 14 will be described, it being noted that identical structure is provided in booth 12. This mounting arrangement comprises a circular collar ring 121 which is received in a circular opening in the ceiling 98. Collar ring 121 is fastened to the ceiling as by welding. Four angular mounting tabs 122 are welded to the outer side of collar ring 121 at circumferentially equally spaced locations (90° apart) so that a leg of each tab projects horizontally from the collar ring 121.

Figure 8:
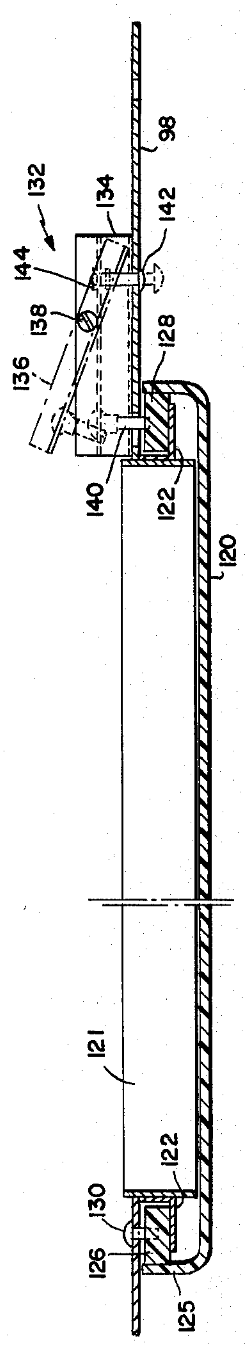
FIGURE 8 is a section taken on the line 8—8 of FIGURE 2.

The ceiling panel 120 has a side wall 125 which is constructed to enclose the ring 121. In the assembled position as shown in FIGURE 8, the wall 125 is in spaced opposed relationship with the collar ring 121. Four Plexiglas lugs 126, 127, 128 and 129 are fastened to the inner side of the wall 125 at circumferentially equally spaced locations (90° apart). In the assembled position of the ceiling panel, the lugs 126, 127, 128 and 129 rest on the mounting tabs 122.

Figure 2:
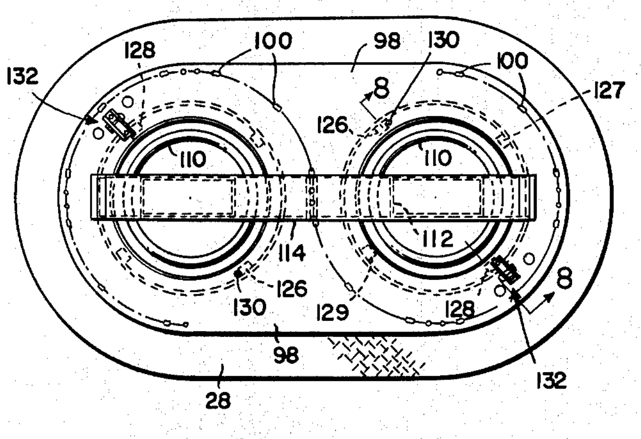
FIGURE 2 is a plan view of the installation shown in FIGURE 1 with the roof removed.
Figure 1:
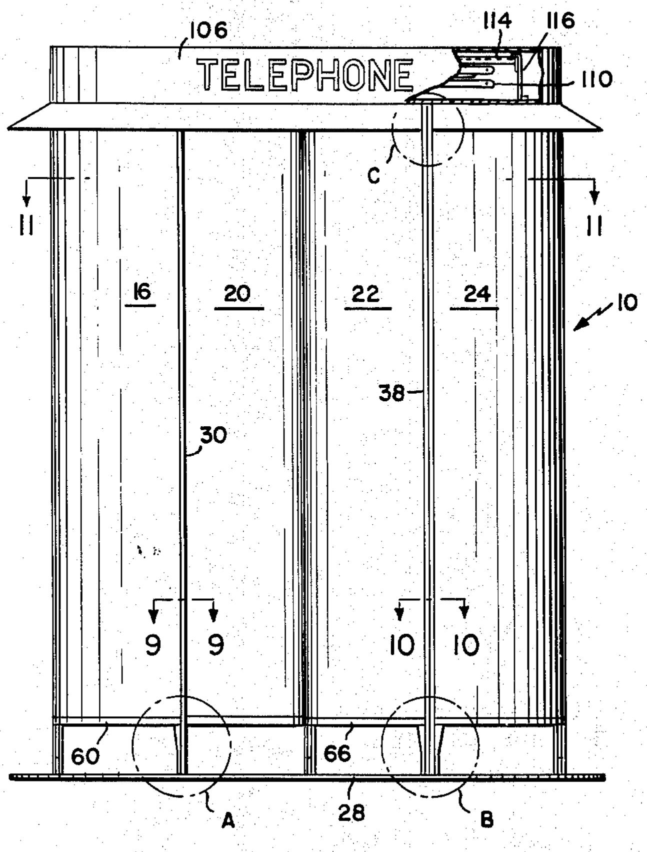
FIGURE 1 is a front elevation of a telephone booth installation in accordance with this invention.
Figure 3:
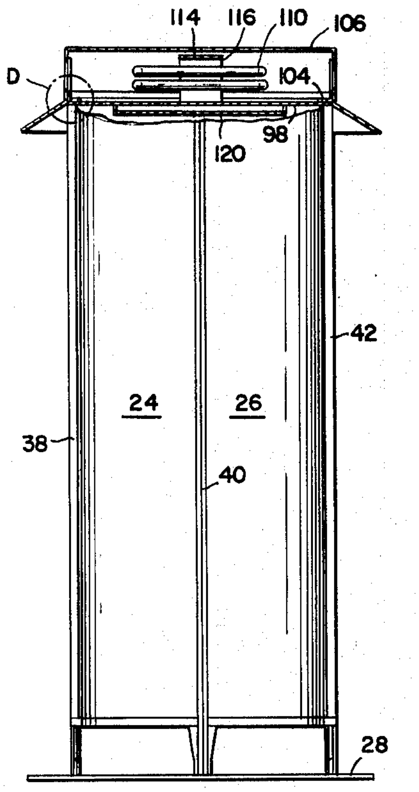
FIGURE 3 is a side elevation, with parts broken away, of the telephone booth installation shown in FIGURE 1.

Stop means are provided for holding the ceiling panel 120 in this supported position. The stop means comprises a fixed stop consisting of a pin 130 mounted in the ceiling 98 at a location adjacent what may be termed the clockwise side of the mounting tab supporting lug 126 as viewed in FIGURE 2. The stop means also comprises a locking device 132 movable between a locking and a releasing position.

The locking device 132 comprises a pair of U-shaped channel members 134 and 136. Channel member 134 is mounted on ceiling 98 in a position on the counterclockwise side of mounting tab 122 which supports lug 128.

The base of the channel member 134 rests on the top side of ceiling 98. Channel member 136 is nested within channel member 134 and is movably mounted on a pivot pin 138 which extends between the sides of channel member 134 and through the sides of channel member 136. Channel member 136 may pivot from the horizontal position to the raised position as shown in dotted lines in FIGURE 8. At one end, channel member 136 carries a stop pin 140 which projects downwardly from the channel member base through openings in the base of channel member 134 and ceiling 98 to a position to limit counterclockwise movement of ceiling panel 120 by contact with the lug 128. A lock screw 142 threadedly engages ceiling 98 and projects upwardly through openings in the bases of channel members 134 and 136. The projecting end of lock screw 142 carries a nut 144 which contacts the upper end of the base of channel member 136.

When lock screw 142 is screwed all the way into ceiling 98, the nut 144 is in an upper position whereby movable channel member 134 is in a horizontal position. Accordingly, pin 140 blocks counterclockwise movement of the ceiling panel 120 by blocking lug 128. It is noted that the channel member 136 is biased to the horizontal position by reason of the location of the pivot and the provision of the stop pin 140. This normal position is the longitudinal position.

When it is desired to remove a ceiling panel 120, lock screw 142 is threaded outwardly of ceiling 98 so that, by reason of the contact between nut 144 and channel member 136, the channel member is moved to the dotted line position in which the stop pin 140 is raised to its upper position.. Accordingly, ceiling panel 120 may be rotated in a counterclockwise direction to clear the lugs from the mounting tabs whereby the ceiling panel 120 may be removed.

When it is desired to replace a ceiling panel 120, the ceiling panel is moved upwardly and rotated in a clockwise direction to position the lugs on the mounting tabs. The fixed stop 130 limits the clockwise movement at the proper position by blocking lug 126. The locking device 132 is then moved to the locking position by rotation of lock screw 142 upwardly to permit downward movement of the channel member 136 and locking pin 140. The locking pin 140 is thus positioned adjacent the lug 128 on the ceiling panel to limit counterclockwise movement of the ceiling panel. Accordingly, the ceiling panel is held securely in the position shown in FIGURE 8.

As is usual, each of the booths is provided with a telephone 143 mounted on a backboard 145 and with a shelf 146 beneath the telephone. These elements are all mounted on a pair of vertically extending pipes 148 and 150, which extend throughout the length of the booth. As is shown in FIGURE 11, the telephones 143 are mounted in opposed relation to the doorway of the booths 12 and 14. By this arrangement, the telephones are positioned with a substantial spacing therebetween and to face in opposite directions whereby a good acoustic efficiency is obtained. It will also be noted that the users of the telephone booths 12 and 14 will face in opposite directions. Accordingly when the booths are used concurrently, the users will face in opposite directions so that there will be a minimum of intereference between them. Also, the telephone in each booth is positioned to be enclosed with approximately the same amount of the wall 10 on either side thereof so that each booth is provided with optimum shielding from noise externally of the booth.

Figure 12:
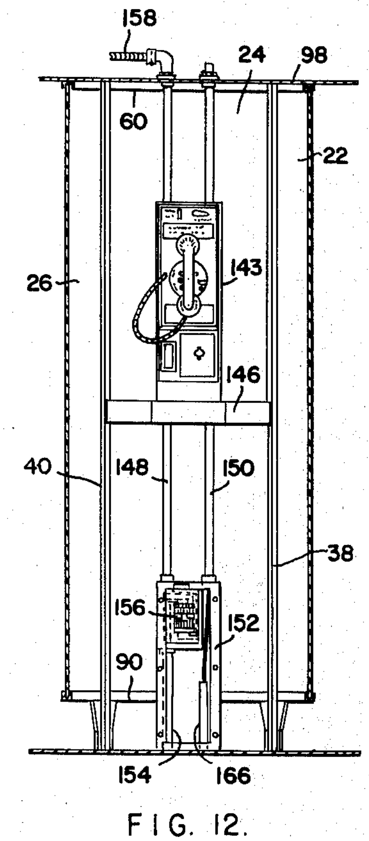
FIGURE 12 is a section taken on the line 12—12 of FIGURE 11.
Figure 13:
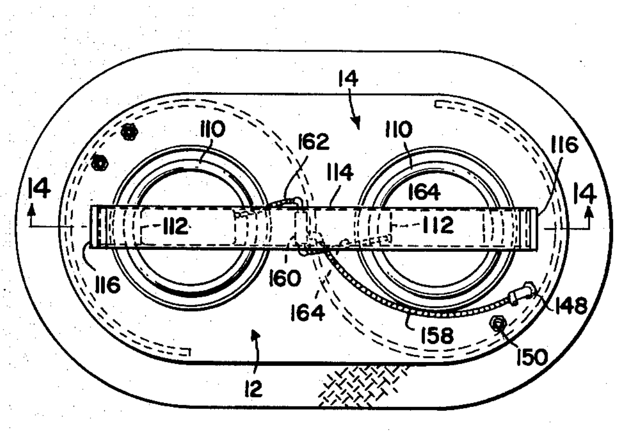
FIGURE 13 is a plan view of the telephone booth installation with the roof removed and showing details of the electrical connections.
Figure 14:
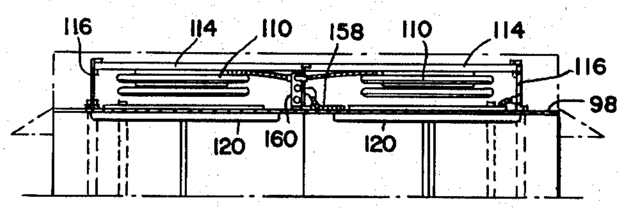
FIGURE 14 is a fragmentary section taken on line 14—14 of FIGURE 13.

The electrical lines for the telephone booth installation are shown in FIGURES 11 to 14. As shown in FIGURE 12, the power line extends into a housing 152 (shown with its cover removed) in the booth 14 by way of a conduit 154 and is connected to the usual circuit breaker 156. An electrical line 158 passes through pipe 148 into the ceiling compartment where it is connected to a junction box 160. Electrical lines 162 and 164 deliver power from the junction box 160 to the electrical means 112 for each of the booths 12 and 14, respectively.

The telephone line enters the housing 152 by way of a conduit 166 and passes through the telephone 142 by way of the pipe 150. There is provided a separate telephone entry for each of the booths 12 and 14.

It will be evident that the S-shaped telephone booth installation in accordance with this invention may be constructed very easily and with a minimum number of different parts. The construction involves the standardization of many of the parts of the booth. For example, there may be used identical wall sections, vertical posts, top channels and bottom channels. This advantage is provided by reason of the construction in which the wall 10 is divided into six one-quarter circular sections. Also many of the elements in supporting structures for the vertical post may be duplicated.

It will be evident that various modifications in the construction and arrangement of parts may be made in the illustrated structure without departing from the scope of the invention. Accordingly, it is not desired to be limited except as required by the following claims.

What is claimed is:

1. A telephone booth installation comprising a base, an upright wall means, and means mounting said wall means on said base, said wall means being substantially S-shaped for providing a pair of substantially cylindrical telephone booths, and consisting of a plurality of arcuate sections having substantially the same shape and construction positioned in end-to-end relation, said mounting means including a plurality of upright posts having substantially identical channel members receiving the vertical edges of said wall sections, one of said posts being positioned at each end of said sections, means securing each of said upright posts to said base, a plurality of substantially identical, horizontally extending arcuate channells, a pair of said channels extending between each pair of adjacent upright posts to provide channels receiving the top and bottom edges of the associated wall section and, said channels receiving the bottom edges of the wall sections being spaced above said base, a substantially oval-shaped ceiling mounted on top of said upright posts and said top channels and enclosing the top of said pair of telephone booths, means fastening said upright posts to said ceiling, and means fastening said top channels to said ceiling.

2. A telephone booth installation comprising a base, an upright wall means, and means mounting said wall means on said base, said wall means being substantially S-shaped for providing a pair of substantially cylindrical telephone booths, and consisting of a plurality of arcuate sections having substantially the same shape and construction positioned in end-to-end relation, said mounting means including a plurality of upright posts having substantially identical channel members receiving the vertical edges of said wall sections, one of said posts being positioned at each end of said sections, means securing each of said upright posts to said base, a plurality of substantially identical, horizontally extending arcuate channels, a pair of said channels extending between each pair of adjacent upright posts to provide channels receiving the top and bottom edges of the associated wall section and, said channels receiving the bottom edges of the wall sections being spaced above said base, there being provided six of said arcuate sections each having a shape approximating a quarter of a circle, three of said sections being provided for each booth.

3. A telephone booth installation consisting of a pair of telephone booths comprising a base, an upright wall means, means mounting said wall means in the upright position on said base, a ceiling extending across the top of said wall means, said wall means being a continuous, substantially S-shaped construction for providing the pair of telephone booths so that each booth is enclosed by a circular wall portion extending arcuately substantially greater than 180° to provide a substantially cylindrical enclosure, said wall means comprising a plurality of arcuate sections having substantially the same shape and construction positioned in end-to-end relation, said mounting means including upright posts for supporting the ends of said sections, a pair of constricted openings formed adjacent the terminal ends of said wall means to provide doorways for the booths, each doorway being defined between a terminal end of said S-shaped wall means and an opposed portion of said wall means spaced therefrom a distance substantially less than the diameter of the booth whereby each booth provides an enclosure which shields the user thereof from noise externally of the booth.

4. A telephone booth installation according to claim 3 wherein said mounting means for said wall means includes a plurality of substantially identical, horizontally extending arcuate channels, a pair of said channels extending between each pair of adjacent upright posts to provide channels receiving the top and bottom edges of the associated wall section.

5. A telephone booth installation according to claim 3 wherein said upright wall means consists of six 90° arcuate sections positioned in end-to-end relation with three sections forming each booth.

References Cited by the Examiner

UNITED STATES PATENTS

| | | | |
|---|---|---|---|
| 480,925 | 8/1892 | Hinkley et al. | 20—3.5 |
| 1,857,913 | 5/1932 | Judelson | 20—3.5 |
| 2,337,885 | 12/1943 | Hallam | 189—2 |
| 2,491,144 | 12/1949 | Yankovitch | 220—55.1 |
| 2,982,196 | 5/1961 | Sherron | 20—3.5 X |
| 2,995,221 | 8/1961 | Sherron | 189—2 |
| 3,046,615 | 7/1962 | Sherron | 20—3.5 |

FOREIGN PATENTS

| | | |
|---|---|---|
| 557,589 | 5/1958 | Canada. |

HARRISON R. MOSELEY, *Primary Examiner.*